Feb. 4, 1936.  A. E. COLLINS  2,029,359
APPARATUS FOR SHIRRING RUBBER ARTICLES
Filed April 20, 1934  6 Sheets-Sheet 3
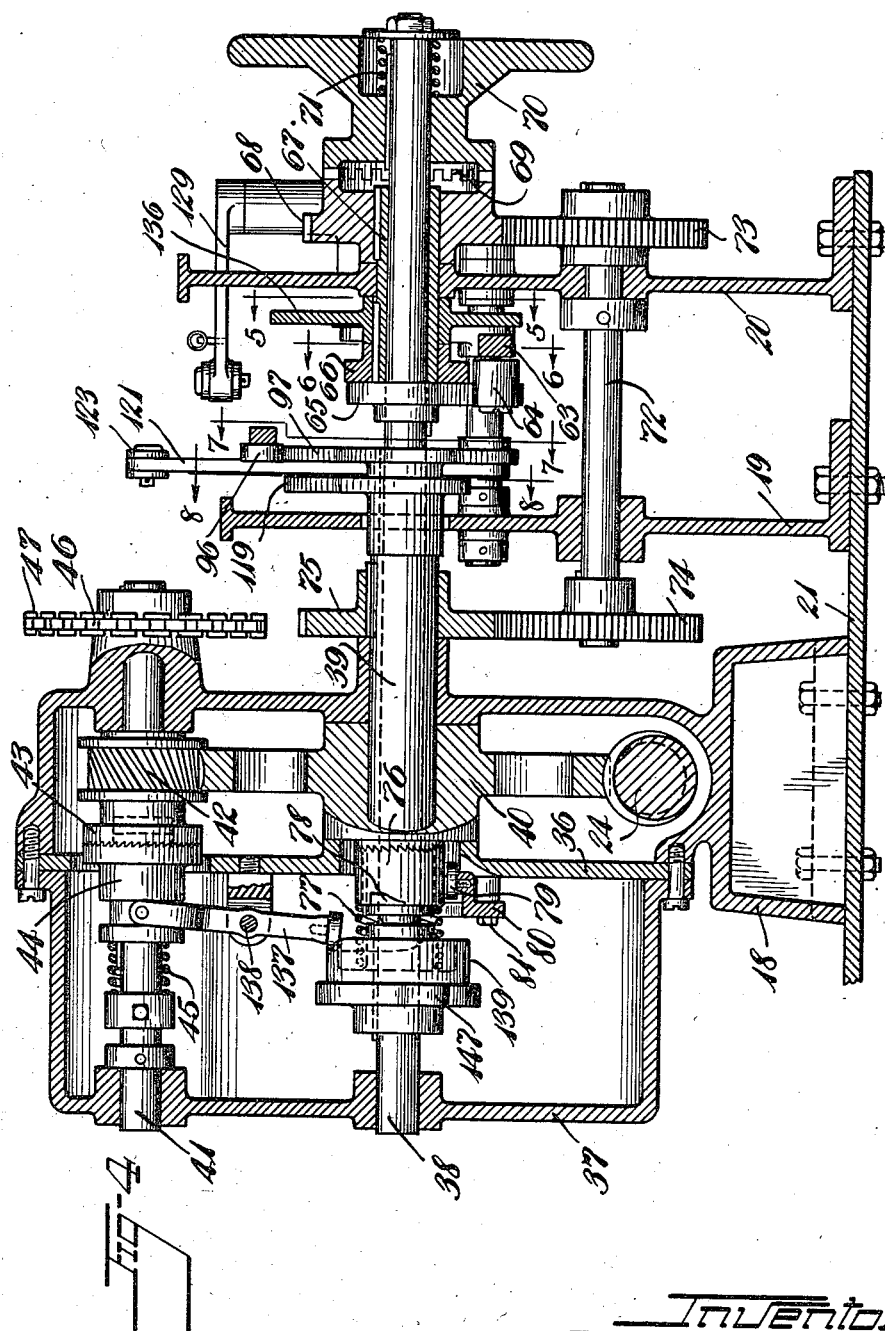
Inventor
Arthur E. Collins
By Eskin & Avery
Attys

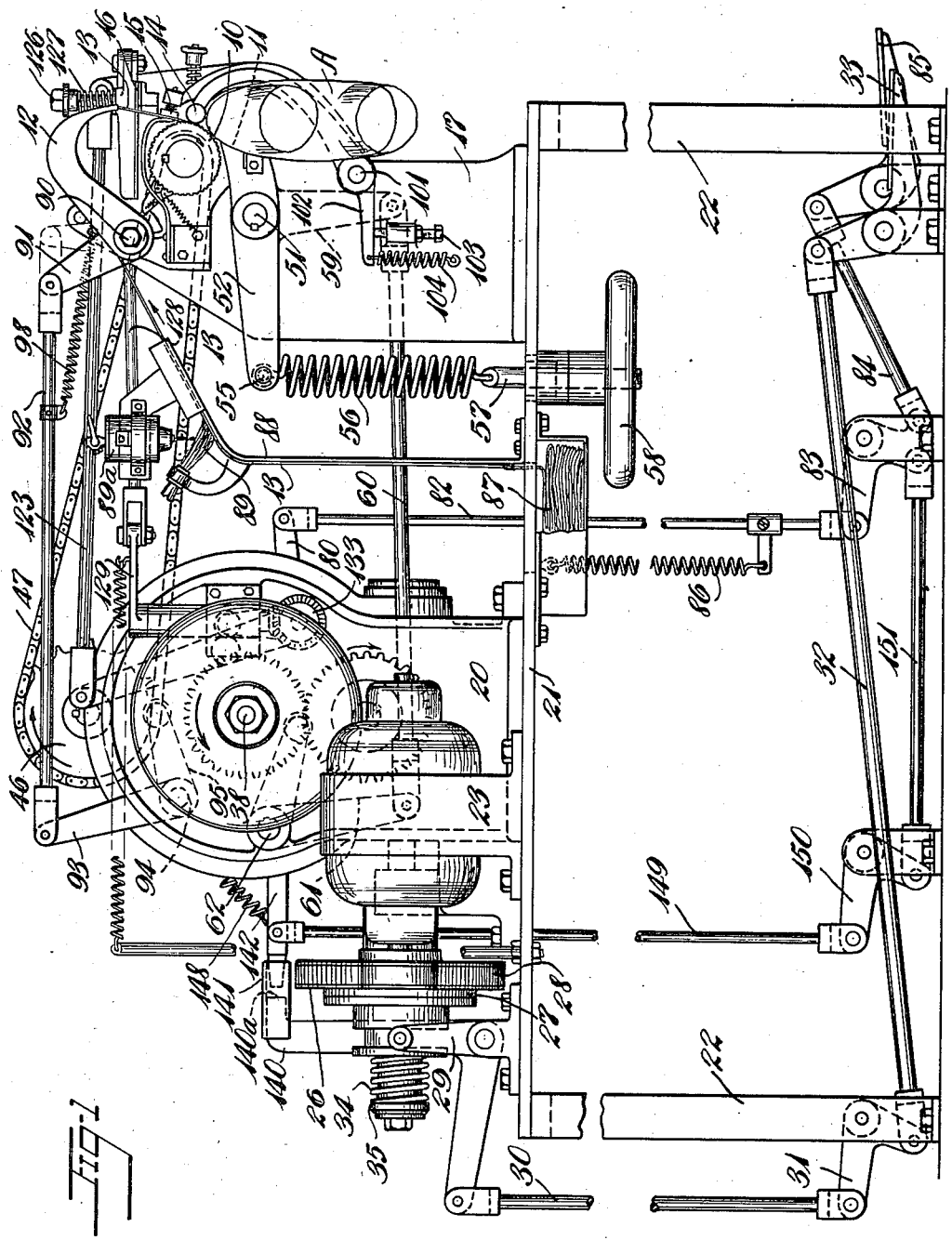

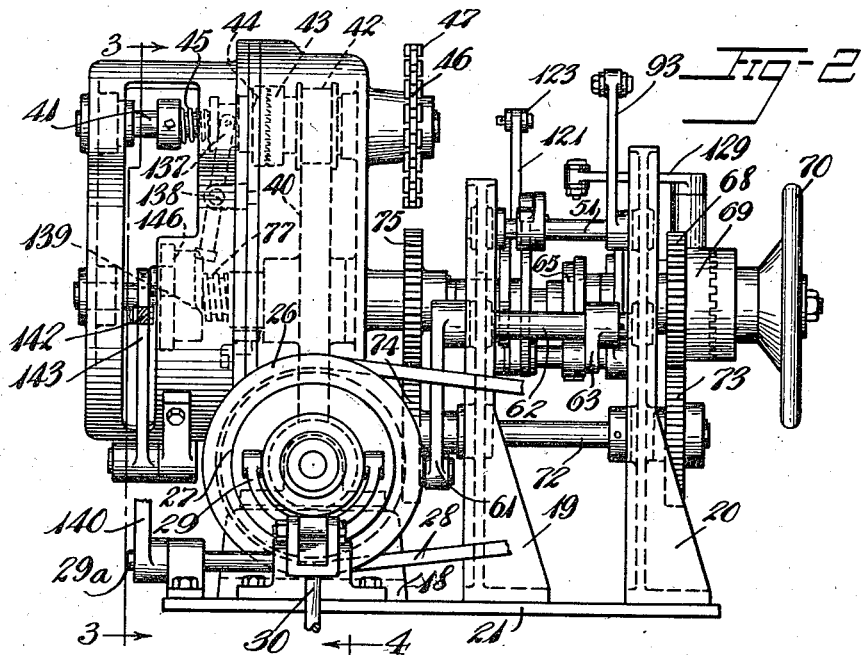

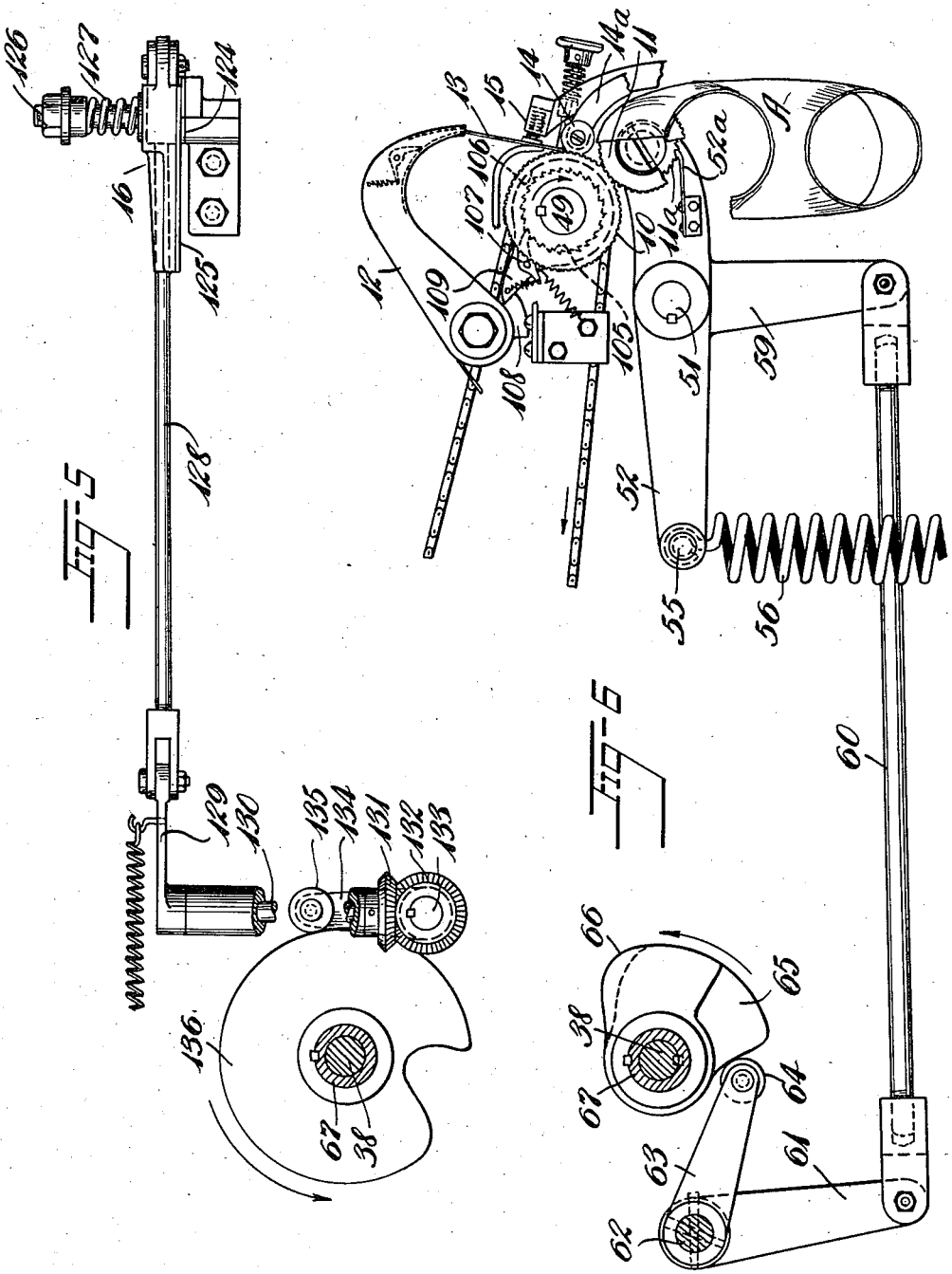

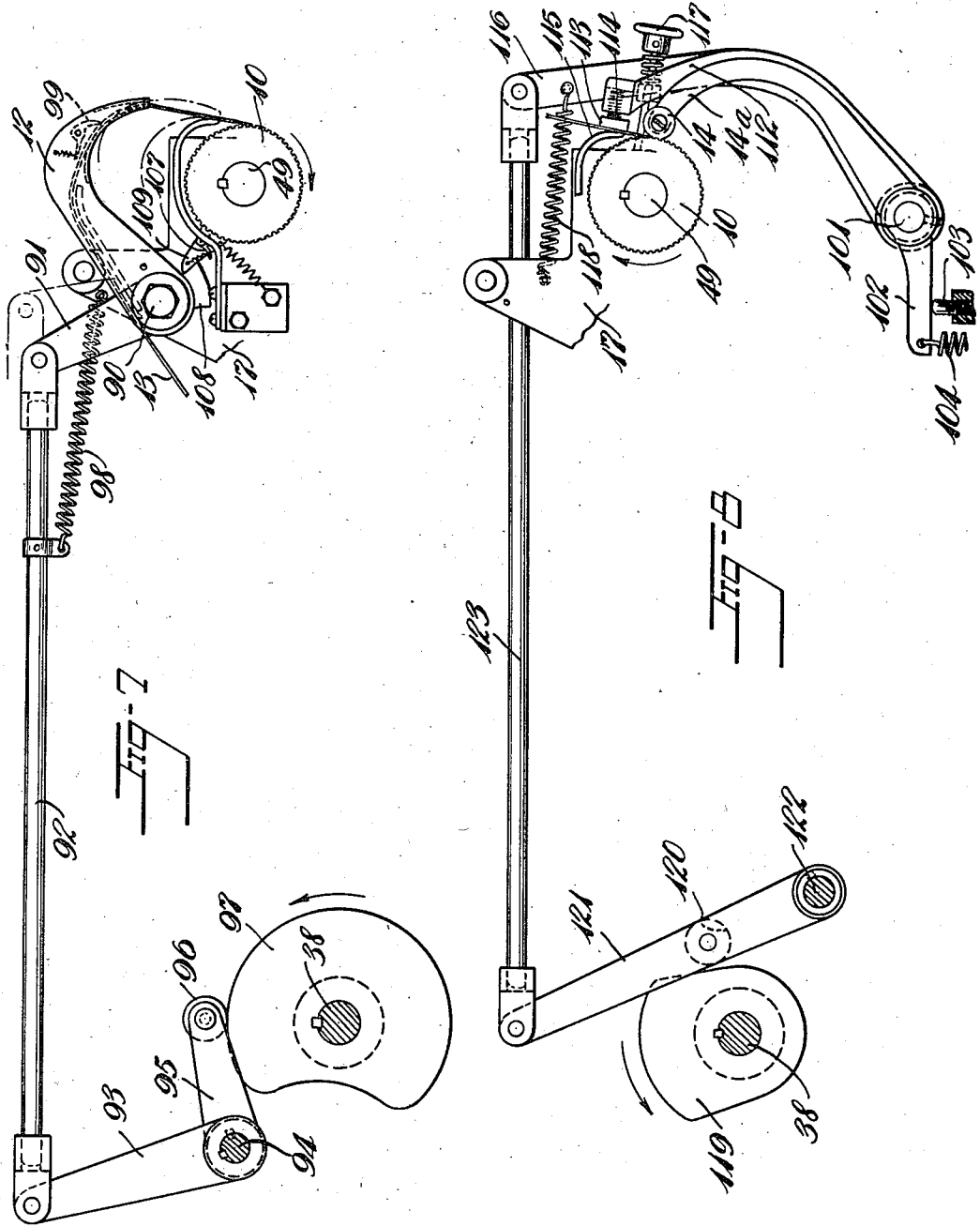

Feb. 4, 1936.  A. E. COLLINS  2,029,359
APPARATUS FOR SHIRRING RUBBER ARTICLES
Filed April 20, 1934  6 Sheets-Sheet 6
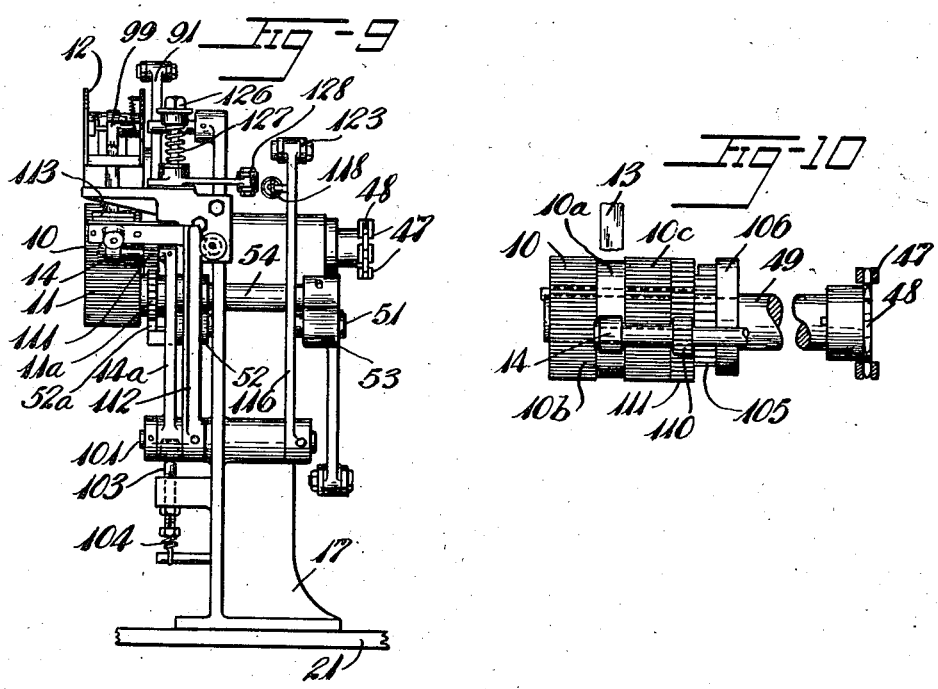
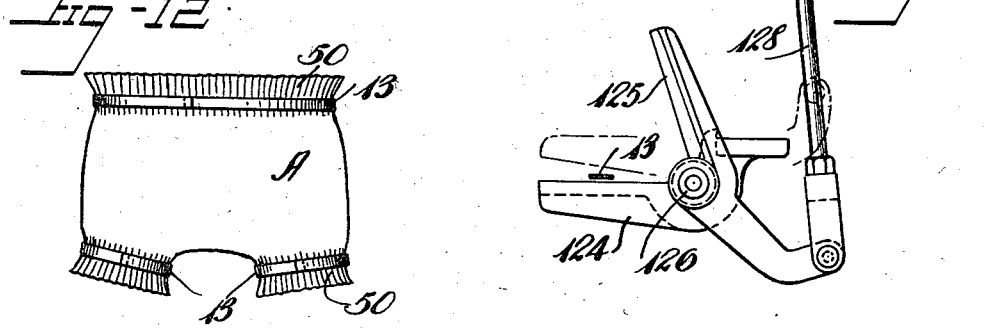
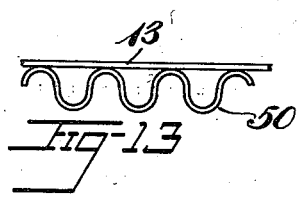
Inventor
Arthur E. Collins
By Eakin & Avery
Attys Patented Feb. 4, 1936

2,029,359

UNITED STATES PATENT OFFICE 2,029,359

APPARATUS FOR SHIRRING RUBBER ARTICLES

Arthur E. Collins, Cuyahoga Falls, Ohio, assignor to The B. F. Goodrich Company, New York, N. Y., a corporation of New York Application April 20, 1934, Serial No. 721,497

10 Claims. (Cl. 154—30)

This invention relates to apparatus for shirring the margins of a rubber article and simultaneously applying reinforcing bands thereto, and it is especially useful in the manufacture of baby pants and other sheet rubber articles where it is desired to shirr the rubber around an opening and to apply an unshirred ornamental and reinforcing band of rubber thereto.

The principal objects of the invention are to provide accurate placement of the leading end of the strip, to provide for feeding the strip from a continuous supply, to provide automatic measuring and cutting of the strip from the supply, and generally to reduce cost of manufacture and provide an improved product.

Other objects will appear from the following description and the accompanying drawings.

In the drawings:

Fig. 1 is a side elevation of a preferred form of the device with an article in place for the operation of shirring the article and applying a band thereto, parts of the sub-structure being broken to conserve space.

Fig. 2 is a rear elevation of the mechanism showing the drive mechanism, the lower frame being removed.

Fig. 3 is a sectional view taken on line 3—3 of Fig. 2.

Fig. 4 is a vertical section taken on line 4—4 of Fig. 3, showing the transmission mechanism.

Fig. 5 is a detail view taken on line 5—5 of Fig. 4, showing the tape-cutting control mechanism, parts being broken away.

Fig. 6 is a detail view taken on line 6—6 of Fig. 4, showing the shirring and tape feeding mechanism, parts being broken away.

Fig. 7 is a detail view taken on line 7—7 of Fig. 4 showing the tape threading mechanism, parts being broken away.

Fig. 8 is a detail view taken on line 8—8 of Fig. 4, showing the tension-lifting mechanism.

Fig. 9 is a front view of the operating mechanism, other parts being broken away.

Fig. 10 is a detail view of the upper shirring roll and tape feeding roll, indicating a portion of tape, other parts being broken away.

Fig. 11 is a detail plan view of the tape shear.

Fig. 12 is a view of a pair of baby pants with the reinforcing tapes applied.

Fig. 13 is an enlarged detail view of the article produced, showing the manner in which the band is attached to the shirred article.

Referring to the drawings, the mechanism for operating upon the article, which article is shown in Fig. 1 and designated by the letter A, comprises a driven shirring roll 10, an article supporting roll 11, mounted to swing toward and away from roll 10, and to press the article thereagainst, a swinging tape guide 12, to advance the leading end of a tape 13, a tape pressing roller 14, a tension-brake 15, and a tape cutting shear 16. These parts, which will be more fully described herein, are all mounted on a pedestal 17. They are controlled and operated through a transmission, illustrated in Figs. 2, 3, and 4, supported by pedestals 18, 19, and 20.

Pedestals 17, 18, 19, and 20 are supported by a table 21 mounted on legs 22. A motor 23, for driving the device, is also mounted upon the table.

The mechanism for driving the shirring roll 10 is as follows: A worm 24 is horizontally journaled in pedestal 18 and its shaft 25 is driven by a belt pulley 26 through a clutch 27. Pulley 26 is driven from the motor 23 by a V-belt 28. A clutch fork 29 is connected through a link 30, a bell crank 31, and a link 32, with a pedal 33, and may be operated by depressing the pedal to disengage the clutch 27 and permit pulley 26 to run free on its shaft. A coil spring 34 is placed under tension between the clutch 27 and a collar 35, fixed to the shaft, and normally holds the clutch in engagement with the pulley.

Pedestal 18 is formed to provide one side of a gear case and its open side is attached to a partition 36 and a cover 37. A horizontally disposed shaft 38 extends through aligned bearings in case 37 and pedestals 18 and 20. A quill 39 is journaled on the shaft 38 and through pedestal 18 for a purpose hereinafter to be described. A worm wheel 40 is journaled on quill 39 between pedestal 18 and the partition 36. It meshes with worm 24.

A countershaft 41 is rotatably supported in bearings in pedestal 18 and cover 37. A spiral pinion 42 is rotatably mounted on shaft 41 and is driven by the worm wheel 40. A jaw clutch part 43 is formed integral with pinion 42. A sliding cooperating clutch member 44 is feather-keyed to the shaft and normally held in engagement with the pinion by a coil spring 45. When the clutch is engaged the shaft 41 is driven by the worm wheel 40. A sprocket 46 is mounted on a projecting end of shaft 41. It engages a chain 47 which drives a sprocket 48 fixed to a shaft 49 which is journaled in pedestal 17 and has the shirring roll 10 fixed thereto.

The shirring rolls operate in the same manner as those of the Brundage Patent No. 1,371,853. The roll 10 is provided with gear teeth of the desired pitch, depending on the fineness of the shirring desired, and the roll 11 is provided with corresponding teeth which mesh therewith. The body portion of the article passing therebetween is formed into corrugations 50 (see Fig. 13) and while held in corrugated form the tops of the corrugations are united by pressure to a plain tape 13. For this purpose the roll 10 is formed with a smooth portion 10a of width equal to the tape and located between toothed portions 10b, 10c. The diameter of the plain portion is such that it contacts with the tops of the teeth on roll 11, which extend entirely across the face of roll 11, when the teeth of the rolls are meshed.

Roll 11 is normally spring-pressed toward roll 10, but means are provided for automatically separating the rolls when an article has been shirred and taped to permit removal and replacement of the articles. For this purpose, a shaft 51 is journaled in pedestal 17, parallel to shaft 49 and a pair of levers 52, 53, are keyed thereto. A shaft 54 extends through the forward ends of the levers and roll 11 is journaled on a projecting end thereof. The rearwardly extending ends of levers 52, 53 are connected by a rod 55. A coil spring 56 has one end attached to rod 55; the other end is attached to a tension screw 57 which extends through an aperture in plate 21 and is threaded to engage a hand-nut 58. The arrangement is such that spring 56 normally holds rolls 10 and 11 in engagement.

Lever 53 is formed with a depending arm 59. A rod 60 connects this arm to an arm 61 fixed to a fulcrum shaft 62 journaled in pedestals 19 and 20. An arm 63 also fixed to shaft 62, carries a cam roller 64. This roller contacts with a cam which acts to separate rolls 10 and 11 during part of the cycle of the machine.

Where the machine is used to shirr the openings in a rubber garment such as that illustrated in Fig. 12, it is desirable to provide means for regulating the time when rolls 10 and 11 will be in contact. For this purpose the cam which contacts with roller 64 is made adjustable. One part 65 of the cam is keyed to shaft 38. The other part 66 is keyed to a quill 67 journaled on the shaft and through pedestal 20. A gear wheel 68 is also keyed to quill 67 and has a jaw-clutch toothed portion 69. A mating jaw toothed hand wheel 70 is feather keyed to shaft 38. The jaw-toothed portions are held in engagement by a coil spring 71. By this arrangement the cam parts 65, 66 are normally locked together but cam part 66 may be shifted circumferentially with cam part 65 by pulling the hand wheel to the right in Fig. 4 and rotating the shaft 38 with relation to the quill 67.

With the cam parts locked together the cam is driven as follows: A countershaft 72 is journaled in pedestals 19 and 20. A gear 73, fixed thereto, meshes with gear 68. A second gear 74, fixed to the cam shaft, meshes with a gear 75 keyed to quill 39. A collar 76 is mounted to slide on a feather key on quill 39 and has a toothed face adapted to engage a toothed clutch face on worm gear 40. A coil spring 77 holds the collar 76 in enagement with the gear. A wedge cam 78 is formed on collar 76. A roller 79, carried by an arm 80, fulcrumed on partition 36 and 81 is normally held in such position that it does not contact with the wedge cam 78, so that clutch 76 remains engaged with the worm wheel 40. Arm 80 is connected to a link 82, which through a bell crank 83, and a rod 84, is connected with a pedal 85. A tension spring 86, having one end attached to plate 21 and the other end to rod 82 holds roller 79 out of contact with the wedge. By depressing the pedal 85, the roller 79 is forced into the path of wedge 78 and disengages the clutch.

The tape 13 is drawn from a supply 87 and follows a guide 88 under a brush 89 which removes any excess dust therefrom. A drip tank 89a containing a rubber solvent, for moistening the tape, may also be provided. Before reaching the shirring rolls, the tape 13 passes through a movable guide 12. This movable guide is pivoted to pedestal 17 at 90 and is curved and pointed so as to closely approach the bight of rolls 10 and 14 on its downward movement to advance the leading end of the tape thereto. A lever arm 91, attached to the guide, is connected by a rod 92 to an arm 93 fixed to a fulcrum shaft 94, journaled in pedestals 19 and 20. An arm 95, also fixed to the shaft 94, carries a roller 96 which engages a cam 97 fixed to shaft 38. A tension coil spring 98 has one extremity attached to rod 92 and the other to pedestal 17 and acts to hold roller 96 toward cam 97. A detent 99, pivoted on the movable guide 12, contacts with the tape and permits only forward feed of the tape.

The tape holding roller 14 is mounted on a lever 14a fulcrumed on a shaft 101, supported by pedestal 17. An arm thereof, 102, rests against a stop 103 and is held thereagainst by a tension spring 104. Roll 10 is provided with a ratchet wheel 105 fixed thereto. A collar 106 loosely retained on shaft 49 carries a pawl 107. A lug 108 on guide 12 stands in the path of an arm 109 of the collar 106 and on the upward movement of the guide 12 after the leading end of the tape has been fed to the bight of rolls 10 and 14, the lug 108 strikes arm 109 and thereby slightly advances the roll 10 to proper position to register with roll 11 when roll 11 is engaged therewith.

Roll 14 is integral with a pinion 110 (see Fig. 10) which meshes with a gear 111, integral with roll 10, whereby positive driving of roll 14 is accomplished.

To provide tensioning of the tape, an arm 112 is fixed to shaft 101 and carries a brake shoe 113 which it supports on a coil spring 114. Shoe 113 presses the tape against a stationary guide 115. Arm 112 also carries an adjustable stop 117 which bears against pedestal 17 to limit its movement. A coil spring 118 urges an arm 116, also attached to shaft 101, and thereby the brake shoe 113, toward the strip.

In order to lift the tension device during advance of the leading end of the tape, a cam 119 is rigidly mounted on shaft 38 and engages a roller 120 carried by an arm 121 pivoted at 122. Arm 121, through a rod 123, engages arm 116. The shear 16 is provided to cut the tape at a point near the shirring rolls when the application of the band is nearly completed. This shear comprises a stationary blade 124, mounted on pedestal 17, and a movable blade 125, pivoted at 126 to the stationary blade. A coil spring 127 surrounding the hinge bolt keeps the blades in cutting relation. Blade 125 is connected to a rod 128, which engages an arm 129, fastened to a vertical shaft 130. Shaft 130 carries a bevel gear 131, which meshes with a similar gear 132, fixed to a shaft 133. Shafts 130 and 133 are supported in suitable bearings by pedestal 20. Shaft 133 has an arm 134, fixed thereto, which carries a roller 135, that engages a cam 136 keyed to quill 67.

In order to assure the proper meshing of the teeth on rolls 10 and 11 when separated and thereafter returned to engagement, roll 11 is provided with a ratchet wheel 11a, attached thereto, and a spring 52a is attached to arm 52, adjacent thereto, frictionally to engage the ratchet and hold the roll against accidental rotation when it is out of mesh with roll 10.

In order to prevent rotation of the shirring rolls during a part of the cycle of operations, and thereby to permit placing and removing of articles, a shifter fork 137 is pivoted at 138 on the partition 36, and one end thereof engages clutch 44. The other end engages a cam 139 fixed to shaft 38. By withdrawing the clutch 44 this cam stops rotation of shaft 41 during part of the cycle.

It has hereinbefore been shown that clutch 27 is disengaged, and therefore all power disconnected from the machine, by the operator stepping on pedal 33. The machine may therefore be stopped at any point in its cycle in that manner. Additional means are provided for automatically throwing out the clutch 27 at the end of a normal cycle of the machine and for permitting continued operation of the shirring rolls while the cam-operated mechanisms are dormant to operate an article other than those for which the machine is set.

For this purpose, the shifter fork lever 29 (see Figs. 1 and 3) is attached to a rock shaft 29a. A lever 140 also fixed to the shaft 29a extends above the clutch pulley 26 and is bent to provide an abutment 140a, a shroud 141 is attached to the lever and extends past the abutment enclosing it on the top and sides. A prop 142 has one end pivoted to a lever 143 and the other end is adapted to enter the shroud and engage the abutment 140a. Lever 143 is pivoted at 144 to the cover 37 and carries a cam roller 145 at its upper end. A cam 146, fixed to shaft 38, has a raised portion 147, adapted to deflect the lever 143. Should such deflection occur when the prop 142 is engaged with the abutment 140a, clutch 27 would be disengaged. A tension coil spring 148 normally holds the prop in such engagement. A rod 149 has its upper extremity pivoted to the prop 142 and its lower extremity pivoted to a bell crank 150. Bell crank 150 is connected to bell crank 83 by a link 151, so that, when pedal 85 is depressed, the prop 142 is swung downwardly from the abutment 140a and permits the engagement of clutch 27. In this position, should the cam 146 revolve to a point where the hump 147 normally would disengage the clutch 27, no disengagement of the clutch would occur and worm wheel 40 and the shirring rolls would continue to be driven, but since by the act of withdrawing the prop 142, the roller 79 is forced in the path of wedge 78, clutch 76 would be withdrawn, disconnecting the cam-mechanism controlling the opening of the shirring rolls, the cutting of the tape, the lifting of the tension, and the feeding of the tape end, all of which mechanism would remain dormant until clutch 76 is reengaged. This would happen only when pedal 85 is released. Upon release of pedal 85, prop 142 would enter shroud 141, and during the next movement of cam 146, clutch 27 would automatically be opened. This construction permits a long edge to be shirred and taped continuously by the operator holding down the pedal 85.

The operation of the machine is as follows: Assuming that a limb opening of a pair of baby pants is to be shirred and taped, and that the clutch 27 is held disengaged by the prop 142, the roller 145 will be resting upon the hump of the cam 146, the roller 11 will be depressed, and the tape will be advanced under roll 14. The material of the garment is placed over the roller 11, as shown in Fig. 1. The operator momentarily depresses pedal 85, releasing the prop 142 and engaging clutch 27. Clutch member 76 is in closed position so that all cams start rotating, but clutch 44 is open so that shirring rolls 10 and 11 are not driven. Roll 11 is first raised and brought into mesh with roll 10 by adjustable cam parts 65, 66 acting together. At this point cam 139 engages clutch 44 and the shirring and applying of the tape is started. Before the entire leg opening has been shirred, and while the shirring rolls are operating, the cam 136 causes the shear 16 to cut the tape 13. The pressure roll drops as soon as the trailing end of the tape is applied, the adjustable arm being set accordingly. The tension 14 is then lifted from the tape and the threader 12 moves down until the next leading end of the tape is in the bight of rolls 10 and 14. At this point the clutch 44 is disengaged stopping rotation of roll 10. The threader 12 then raises and its lug 108 slightly advances roll 10 and the tape end. The tension also moves into engagement with the tape. Cam 146 now disengages clutch 27 and the cycle is complete. As previously pointed out, the duration of this cycle may be changed by adjustment of the cams 65, 66, by hand wheel 70.

Should the operator now wish to shirr and band the waist opening of the baby pants, or any greater distance than that for which the machine is set this can be done by holding down the pedal 85 instead of depressing it momentarily. When this is done, the roller 79 is raised into the path of wedge cam 78 so that, while the article is being shirred, clutch 76 is retracted, thereby stopping the rotation of all cams until pedal 85 is released. As the cam 139 is stopped with clutch 44 engaged, the shirring rolls may be operated for an indefinite period. Near the end of the work, however, the operator releases pedal 85, and clutch 76 engages and picks up the cams which continue their cycle, cutting the tape, separating the feed rolls, and rethreading at the end of the shirring and taping operation.

I claim:

1. Apparatus for shirring a margin of a rubber article and simultaneously applying a band thereto, said apparatus comprising a pair of separable shirring rolls between which the article may be fed, means for delivering a reinforcing band to the bight of said rolls, and adjustable cam means for automatically separating said rolls when the shirring of the article is complete.

2. Apparatus for shirring a margin of a rubber article and simultaneously applying a band thereto, said apparatus comprising a pair of separable shirring rolls between which the article may be fed, means for delivering a reinforcing band to the bight of said rolls, and a cam operated shear stationarily mounted adjacent the bight of the shirring rolls for automatically cutting the band from its supply.

3. Apparatus for shirring a margin of a rubber article and simultaneously applying a band thereto, said apparatus comprising a pair of separable shirring rolls, means for driving said rolls, means for supplying reinforcing tape thereto, a cam operated shear for cutting the tape from its supply, means for automatically separating said rolls and operating said cutting means when a determinate length of material has been shirred, and means for indefinitely delaying the opening of the rolls and the cutting of the tape at the will of the operator.

4. Apparatus for shirring a margin of a rubber article and simultaneously applying a band thereto, said apparatus comprising a pair of separable shirring rolls, means for driving said rolls, means for feeding a reinforcing tape thereto, cam means for automatically separating said rolls when a determinate length of material has been shirred, and means controllable by the operator for delaying the opening of the rolls when desired.

5. Apparatus for shirring a margin of a rubber article and simultaneously applying a band thereto, said apparatus comprising a shirring roll, means for driving said roll, a cooperating roll, means for moving the cooperating roll toward and from the shirring roll, means for feeding a tape to said rolls, and adjustable cam means for automatically controlling the rotation and movement of said elements.

6. Apparatus for shirring a margin of a rubber article and simultaneously applying a band thereto, said apparatus comprising a shirring roll, means for driving said roll, a cooperating presser roll, means for moving the presser roll toward and from the shirring roll, means for feeding a tape to said rolls, means for automatically cutting said tape from a supply thereof when the shirring operation is complete, and cam means for determinately controlling the rotation of the shirring roll and movement of the presser roll.

7. Apparatus for shirring a margin of a rubber article and simultaneously applying a tape thereto, said apparatus comprising a shirring roll, means for driving said roll, a cooperating presser roll, means for moving said presser roll toward and from said shirring roll, means for feeding a tape to said roll, means for tensioning said tape, means for cutting said tape from a supply thereof when the shirring operation is complete, and automatic means for controlling the rotation of the shirring roll and the movements of the presser roll.

8. Apparatus for shirring a margin of a rubber article and simultaneously applying a tape thereto, said apparatus comprising a shirring roll, means for driving said roll, a cooperating pressing roll, means for moving said presser roll toward and from said shirring roll, means for feeding tape from a supply to said rolls, means for automatically cutting the tape from the supply at the end of the shirring operation, and means for automatically advancing the leading end of tape from the supply to reset the machine for a succeeding article.

9. Apparatus for shirring a margin of a rubber article and simultaneously applying a tape thereto, said apparatus comprising a pair of shirring rolls between which the margin of the article may be pressed, a supply of tape, means for guiding said tape to the bight of the rolls, means for automatically severing a length of tape from the supply as it is drawn therefrom, and means for advancing the leading end of the supply to the bight of the rolls to supply a succeeding article.

10. Apparatus for shirring the margin of a rubber article and simultaneously applying a tape thereto, said apparatus comprising a pair of cooperating shirring rolls normally out of contact with each other, means for supplying a tape to the margin of the article as it is passed therebetween, timing means for holding the rolls in contact with the article during the shirring operation and for automatically opening said rolls when the article has been shirred, and means for adjusting the time of contact to articles of different dimensions.

ARTHUR E. COLLINS.